US011863398B2

(12) United States Patent
Koodli et al.

(10) Patent No.: US 11,863,398 B2
(45) Date of Patent: Jan. 2, 2024

(54) CENTRALIZED MANAGEMENT OF DISTRIBUTED DATA SOURCES

(71) Applicant: Google LLC, Mountain View, CA (US)

(72) Inventors: Rajeev Koodli, Saratoga, CA (US); Mazin Gilbert, Warren, NJ (US)

(73) Assignee: Google LLC, Mountain View, CA (US)

( * ) Notice: Subject to any disclaimer, the term of this patent is extended or adjusted under 35 U.S.C. 154(b) by 88 days.

(21) Appl. No.: 17/484,349

(22) Filed: Sep. 24, 2021

(65) Prior Publication Data

US 2023/0078246 A1 Mar. 16, 2023

Related U.S. Application Data

(60) Provisional application No. 63/243,252, filed on Sep. 13, 2021.

(51) Int. Cl.
*H04L 41/16* (2022.01)
*H04L 67/10* (2022.01)
*G06N 5/04* (2023.01)
*G06N 20/00* (2019.01)

(52) U.S. Cl.
CPC .............. *H04L 41/16* (2013.01); *G06N 5/04* (2013.01); *G06N 20/00* (2019.01); *H04L 67/10* (2013.01)

(58) Field of Classification Search
CPC ......... H04L 41/16; H04L 67/10; H04L 67/01; G06N 20/00; G06N 5/04; G06N 20/10; G06N 20/20
See application file for complete search history.

(56) References Cited

U.S. PATENT DOCUMENTS

| | | | | |
|---|---|---|---|---|
| 2019/0171169 | A1* | 6/2019 | Di Pietro | G05B 13/04 |
| 2021/0092068 | A1 | 3/2021 | Ismailsheriff et al. | |
| 2021/0325920 | A1* | 10/2021 | Peled | G01K 13/08 |
| 2022/0303291 | A1* | 9/2022 | Baldini Das Neves | H04W 12/009 |

OTHER PUBLICATIONS

International Search Report and Written Opinion for International Application No. PCT/US2022/041019 dated Nov. 17, 2022. 17 pages.

* cited by examiner

*Primary Examiner* — Wing F Chan
*Assistant Examiner* — Billy H Ng
(74) *Attorney, Agent, or Firm* — Lerner David LLP (57) ABSTRACT

Aspects of the disclosure are directed to a central management plane (CMP) of one or more processors for regulating streams of data from each of a number of network nodes of a distributed network. The one or more processors can train and deploy machine learning models across the network nodes, and the CMP can generate policies for each network node. The generated policies specify how a network node is to transmit data to the platform for further training or retraining of the deployed machine learning models. The CMP generates the policies using metric data characterizing each network node and respective streams of input data, and are generated based on a number of objectives, including model output quality of the deployed models, and operational cost to transmit and process streams of data across the distributed network.

20 Claims, 6 Drawing Sheets

CENTRALIZED MANAGEMENT OF DISTRIBUTED DATA SOURCES

CROSS REFERENCE TO RELATED APPLICATIONS

This application claims the benefit of the filing date of U.S. Provisional Patent Application No. 63/243,252 filed Sep. 13, 2021, the disclosure of which is hereby incorporated herein by reference.

BACKGROUND

Computing platforms can provide a number of services across a distributed network of computing devices. Computing devices sending requests to a computing platform are often physically remote from servers of the platform implementing an offered service. These computing devices communicate directly with the computing platform, or indirectly with the computing platform through one or more other devices or communication networks. Services offered by a computing platform can be deployed remotely on computing devices to handle requests remote from the computing platform. Machine learning models can be deployed to remote devices and trained or retrained on a central platform connected to the remote devices.

BRIEF SUMMARY

Aspects of the disclosure are directed to a system for improving the deployment of machine learning models across nodes of a distributed network, by regulating the flow of data to the system from each network node used to train models deployed on each network node. A data management system generates per-data stream policies for each data stream from each network node of a distributed network transmitted to a central platform for training machine learning models. The policy specifies how each network node is to regulate streams of input data from the node and transmit the data to a central platform implementing the data management system. Regulation of a data stream can refer to altering characteristics of the data stream, such as the type, volume, and rate of data passing from the node to the central platform. By default, data streams can be transmitted over a distributed network according to predetermined parameters specifying the rate, type, and/or volume of data transmitted in the streams.

Policies are generated in accordance with a plurality of objectives, such as the output quality of a model deployed on a network node, and the operational cost, for example, measured in network traffic bandwidth or processing cycles, to transmit data from the network node to the data management system. The data management system, through policies generated for each data stream, directs the quantity and quality of data to be transmitted from each node to the platform, reducing network traffic while providing enough data that the central platform can continue to train or retrain deployed models to maintain minimum accuracy or performance benchmarks.

An aspect of the disclosure includes a system, including: a distributed network of a plurality of network nodes; and one or more processors in the distributed network, the one or more processors implementing a central management plane (CMP), the CMP configured to: receive metric data at least partially characterizing a first network node of the plurality of network nodes executing a deployed machine learning model on a stream of input data received by the network node from a data source; generate a policy for regulating the stream of input data transmitted by the network node to the one or more processors; and send the policy to the network node.

An aspect of the disclosure includes a computer-implemented method, including: receiving, by one or more processors, metric data at least partially characterizing a first network node of a plurality of network nodes executing a deployed machine learning model on a stream of input data received by the network node from a data source, the plurality of network nodes part of a distributed network; generating, by the one or more processors, a policy for regulating the stream of input data transmitted by the network node to the one or more processors; and sending, by the one or more processors, the policy to the first network node.

One or more non-transitory computer-readable storage media encoding instructions that when executed by one or more processors, cause the one or more processors to perform operations including: receiving metric data at least partially characterizing a first network node of a plurality of network nodes executing a deployed machine learning model on a stream of input data received by the network node from a data source, the plurality of network nodes part of a distributed network; generating a policy for regulating the stream of input data transmitted by the network node to the one or more processors; and sending the policy to the first network node.

The foregoing and other aspects of the disclosure can include one or more of the following features, alone or in combination. For example, some aspects include all of the following features, together in combination.

The policy can include one or more rules for adjusting one or more of: the rate of the stream of input data transmitted by the first network node to the CMP, the volume of the stream of input data transmitted by the first network node, a time at which the stream of input data is transmitted by the first network node, and the types of data in the stream of input data transmitted by the first network node to the CMP or the one or more processors.

The CMP or one or more processors can be further configured to receive a regulated stream of input data, wherein the regulated stream of input data is the stream of input data after the policy is applied to the stream of input data; and wherein in generating the policy, the CMP or the one or more processors are further configured to generate the policy according to a plurality of objectives based at least on: reducing the operational cost of transmitting the regulated stream of input data over the distributed network or using the regulated stream of input data to train the deployed machine learning model, and increasing the output quality of the deployed machine learning model according to one or more quality metrics, after training the model on the regulated stream of input data.

The operational cost of transporting output data can be further based on one or more of: the rate at which the regulated stream of input data is received by the CMP over a period of time, the volume of the regulated stream of input data received by the CMP, and the type of data in the regulated stream of input data.

The one or more quality metrics of the machine learning model can measure one or more of the inference accuracy, the inference precision, and the inference recall of the machine learning model after training or retraining the machine learning model on training data including the regulated stream of input data.

The machine learning model can be a first machine learning model, and wherein in generating the policy, the CMP or one or more processors can be configured to process the metric data through a second machine learning model trained to generate policies, the second machine learning model trained using labeled metric data: including features corresponding to one or more of the inference accuracy, the inference precision, and the inference recall of the deployed machine learning model, and/or labeled with data characterizing one or more of the rate of the stream of input data, the volume of the stream of input data, and the types of data in the stream of input data transmitted by the network node to the CMP or one or more processors.

The plurality of objectives can further include one or more objectives for training the machine learning model.

The stream of input data can be a first stream of input data, the policy is a first policy, and the metric data is first metric data; and the CMP or one or more processors can be further configured to: receive second metric data at least partially characterizing the performance of the first network node executing the deployed machine learning model on a second stream of input data different than the first stream of input data, and generate and send a second policy for regulating the second stream of input data, the second policy different from the first policy.

The second stream and the first stream of input data can be received from the network node by the same data source.

The CMP can be further configured to: receive an indication of a second network node added to the distributed network; receive metric data from the second network node; determine, based on the metric data of the first network node and the metric data of the second network node, that the first and second network nodes are similar within a predetermined threshold; and in response to the determination, send the policy to the second network node.

The metric data can be first metric data, the policy is a first policy, and the CMP can be further configured to: receive second metric data from a second network node of the plurality of network nodes; generate a second policy using the first metric data, the second metric data, or both the first metric data and the second metric data, wherein the second policy is different than the first policy; and send the second policy to the second network node.

In regulating the stream of input data, the CMP or the one or more processors can be further configured to apply one or more rules of a policy to the stream of input data to adjust the transmission of data in the stream of input data.

The metric data at least partially characterizing a first network node of the plurality of network nodes can include one or more of: physical characteristics of the distributed network or of the first network node, characteristics of one or more streams of data received by the network node, and characteristics of the data source.

DETAILED DESCRIPTION

Overview

Aspects of the disclosure are directed to a system for improving the deployment of machine learning models across nodes of a distributed network, by regulating the flow of data used as training data to the system from one or more data sources in communication with each network node. A data management system generates policies for each data stream of a network node of a distributed network. The policy specifies how each network node is to regulate each stream of input data from the node to a central platform implementing the data management system. Regulating a data stream can refer to altering characteristics, such as the type, volume, and rate, of data passed through a distributed network to the central platform. Before regulation, the data stream can be characterized at least by a rate, volume, or type of data present in the data stream. Initially, the data stream may be subject to predetermined parameters, for example defined by a network node, by the central platform, and/or by another device configured to control the distributed network, for its transmission over the distributed network. For instance, a network node may be initially configured to transmit as much data as possible, limited by network bandwidth and/or the node's processing capacity to transmit data.

Data can be provided to a computing platform for training one or more machine learning models on each of a variety of different network nodes. One problem with transmitting as much data as possible to the computing platform is that incremental increases in the amount of data provided may not result in corresponding improvements to a model trained according to the additional data.

The data management system according to aspects of the disclosure generates a policy in accordance with a plurality of objectives, such as improving the output quality of a model deployed on a network node, and lowering the operational cost, for example measured in network traffic bandwidth or processing cycles, to transmit and process the stream of data from the network node to the data management system.

Network nodes can be physically separated over a large distance and across one or more interconnected networks, compounding the cost to transmit and process data streams of input data. The input data can be used to generate new training data, which can be used by a central computing platform for training or retraining a machine learning model deployed on a network node. As training a machine learning model is a computationally expensive task requiring large amounts of time and computational resources to process training data, a computing platform can train models to be deployed or redeployed on a network node.

The data management system balances model output quality with operational cost to transmit additional data from the node to the system for training or retraining the deployed machine learning model. In other words, the data management system can provide just enough data to meet predetermined output quality thresholds, for example defined to provide a minimum level of quality of user interaction with a node implementing a deployed model. The system can be trained to identify characteristics of a data stream, such as a type, volume, and rate of data, which, when used for training a machine learning model, causes the system to generate a model with an accuracy at least meeting or exceeding predetermined output quality thresholds. The system balances relative performance gains from added training time to a model, with the operational cost for transmitting and processing the additional data from the network node to the platform. As an example, additional input data used to train the model may realize a narrow, but quantifiable, increase in performance in the retrained model. However, the additional input data may place a strain on a distributed network and inhibit the performance of the deployed model in other ways, for example measured in network latency, response time, etc.

The system can provide a policy to the network node to regulate, for example, the type, volume, and rate at which data is transmitted to the system, balance objectives, such as operational cost to transmit additional data to the platform, with model quality improvements as a result of training on the additional data. For example, the policy may define certain time periods at which data transmitted is not to exceed a predetermined threshold, as a way to regulate the rate at which data is transmitted to the system from the network node. Other objectives can include objectives related to training the deployed model to perform a particular task. For example, additional objectives can include reducing or mitigating bias in input data received by the system used in training or retraining the deployed model. Bias can be quantified by one or more statistical measures. Data sources in communication with the network node can be, for example, individual user computing devices, such as mobile phones or personal laptops; one or more or more servers; or any of a variety of computing devices, including wearable devices and other sensors, embedded systems, or other devices configured to communicate with the network node. The way in which the data source communicates with the network node can vary, for example, over a radio access network, a core network, or as part of an operational support system. As part of generating the policy, the data management system is configured to receive characteristics of the network node, which can include the type or types of networks connecting the system to the node. A data management system as described herein can identify patterns between data streams having certain characteristics, with higher levels of model performance as a result of training models on those data streams. Using these patterns, which for example can be learned using a machine learning model, the system can generate the policies specifying how the network node is to regulate data streams to the system, for example by adjusting the rate, volume, and/or type of data transmitted to the platform implementing the system.

As an example, the data management system can be deployed on a computing platform in communication with various network nodes of a telecommunications network. Different nodes may have different models deployed on each node, for example for analyzing streams of telecommunication network data passing through each node, or for automating some processing task that receives telecommunication network data as input. The deployed models may be subject to minimum output quality thresholds, for example a minimum recall rate or a maximum tolerated false positive rate, such as when a deployed model is trained to generate an output classification based on ingested telecommunication network data. As a telecommunication network can be spread far along many physical or virtual computing devices, the various models can be deployed on devices physically proximate to data sources of telecommunication network data. At least some data of each data stream is transmitted by a network node to the data management system, as one or more regulated streams of data.

The data management system can be implemented on one or more computing devices, for example computing devices of a computing platform. The computing platform may be connected to the telecommunications network over a separate connection, and/or be part of the telecommunications network itself. The regulated streams of data are ingested by the data management system and used to train or retrain, for example to update weights of, machine learning models deployed on the network nodes.

After a period of time, for example a predetermined period of time and/or in response to a request from a network node, the data management system can provide an updated model to the network node. The data management system can generate policies for regulating data streams across the various telecommunication network nodes. The network nodes can be configured to regulate data transmitted to the data management system, according to a received policy. Data can be transmitted more efficiently, for example less data or during less network-congested periods of time, without substantially reducing the model performance of models trained on the regulated data by the data management system. In the example of a telecommunications network that may have many different nodes receiving data from a variety of different smaller and heterogeneous networks, implementing the data management system as described herein can reduce the burden of the network in transmitting data.

Each network node in communication with a data management system according to aspects of the disclosure can include one or more node metric engines and one or more data source regulators implemented on nodes of the distributed network. The data management system can include a central management plane (CMP). The CMP receives node metrics data from the respective metric engine implemented on each of multiple nodes of a distributed network. The CMP uses the received node metrics data to generate a corresponding policy of actions to perform, or conditions to enforce, for each node of the distributed network. In some examples, the CMP implements a machine learning model trained to generate policies for each node.

The CMP can be trained with labeled metric data, which can include features of a deployed machine learning model characterizing one or more of the inference accuracy, the inference precision, and the inference recall of the deployed machine learning model. The metric data can be labeled for example, with data characterizing one or more of the rate of the stream of input data, the volume of the stream of input data, and the types of the data in the stream of input data received by the CMP from the network node.

The corresponding data source regulator for a network node receives a policy from the CMP, and performs actions defined by the policy to regulate the stream of input data from the node. For example, the policy can specify a maximum rate, for example, in bits per second, at which the stream of input data is to be provided to the CMP.

Because nodes of the network can be heterogeneous, for example, are in different geographic locations, with different supporting infrastructure, sources of data, data traffic patterns for data to and from each node, etc., the system generates different policies for each data stream received from each node. The data management system accounts for deployment-specific characteristics of each node, as well as specific characteristics of different data streams from different sources of data. The system can generate different policies, even when the base model or task performed at each node is the same for each received stream of data. In this way, the system can receive less data for training one or more different models deployed on a respective node, using a policy that specifies regulated characteristics of each of one or more data streams, which may be received by the node from one or more data sources. Data stream characteristics can vary, and training data can affect model performance in different ways. Therefore, providing multiple policies for multiple data streams can reduce or eliminate adverse effects, such as reduced model quality, as compared with approaches in which a single policy is predetermined and applied to all data streams to the system.

The data management system allows for rapid scaling of new deployments of nodes in the distributed network, and can provide an initial policy based on similarly-deployed nodes to accelerate integration of the node into a distributed network. New nodes can be deployed faster at least because the initial policy can be provided versus deploying the node without a policy, and/or versus deploying the node with a uniform predetermined policy which may not be suited given particular characteristics of the network node and/or data sources, or data transmitted to the node. The data management system can update the initial policy upon receiving metric data, for example, related to geographic location of the node, output quality of the model currently deployed on the node, traffic patterns of the node including characteristics about individual data streams, etc., characterizing the deployment of the new nodes. Faster deployment of nodes can improve the system's capability to add additional computing resources when necessary, and can reduce idle time between receiving a request for additional nodes of resources in the network, and the initialization of the requested node.

Aspects of the disclosure provide for a number of technical advantages. Machine learning models can be trained at a central platform and distributed at different physically remote nodes, for example at cell, near, and far edges. A platform implementing a data management system as described herein can adjust the deployment of each model across heterogeneous network nodes, including adjusting the rate at which data from the node is transmitted to the platform. The policy reflects a variety of different factors unique to each node and data streams from data sources in communication with the node. The operational cost, for example measured in network bandwidth and/or in processing cycles, and performance, e.g., model accuracy, of training the node-deployed models at a platform can be balanced to reduce operational cost in transmitting data over a distributed network, without substantially reducing model quality and performance. The distributed network can use additional resources saved as a result of sending regulated data to the system for other purposes, for example in deploying additional models to the network node and increasing its capability to serve user requests. The data management system, through policies generated at a per-data stream level, allows for just enough data to be transmitted from each node to the platform, reducing network traffic while maintaining minimum accuracy or performance benchmarks for each node.

Generating per-data stream policies allows for more granular adjustment to data streams transmitted to the system, in turn allowing for more efficient data transmission to the system for training a model deployed on a network node, even when more efficient adjustments to regulating one data stream may adversely affect another data stream of the same network node. Each data stream can be regulated, e.g., characteristics of the data stream can be adjusted, individually, at least by the generation and execution of per-data stream policies as described herein.

As the network scales in size, for example as additional network nodes are added, the system can initialize newly added nodes with policies of other nodes identified as similar to the newly added nodes within a threshold. In doing so, the system allows for quickly improving the performance of the newly added node at reduced operational cost for data stream transmission, before later fine-tuning the policy to reflect characteristics specific to the node and of data streams received from the node. This added bootstrapping of a previously-generated policy can reduce the time to deploy a new network node, which not only directly impacts the capability of the platform in receiving and serving processing requests, but allows the platform to react faster to adding new computing resources when the need is identified.

Example Systems

Figure 1:
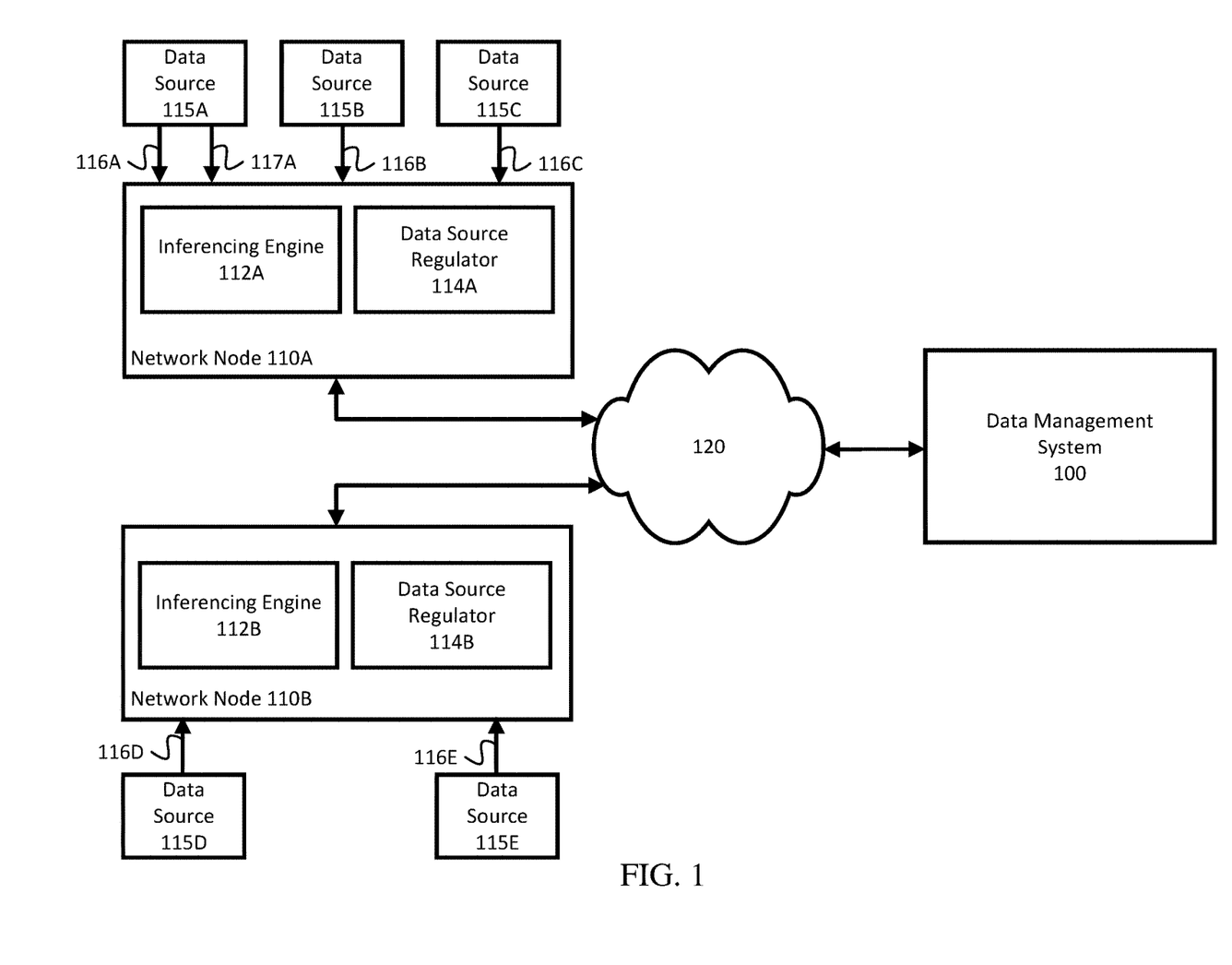
FIG. 1 is a block diagram of an example data management system in communication with network nodes, according to aspects of the disclosure.

FIG. 1 is a block diagram of an example data management system 100 in communication with network nodes 110A-B, according to aspects of the disclosure. The system 100 can be implemented, for example, as part of a computing platform, communicating with the network nodes 110A-B over a network 120. As described in more detail with reference to FIG. 6, the computing platform can include a number of computing devices, such as server computing devices, which can communicate with a number of other devices, such as devices implementing the network nodes 110A-B.

The network nodes 110A-B can be part of a number of network nodes connected over the distributed network 120. Examples of network nodes include user computing devices, such as personal computing devices, wearable devices, or smartphones. In some examples, network nodes can include one or more computing devices in communication with a network of other computing devices. The network node can implement an inferencing engine that is configured to receive input data and requests to process the input data, from the network of computing devices. Network nodes can be implemented in a variety of different locations, for example across different geographic regions. Network nodes can service a variety of different devices, for example corresponding to different users who may or may not be affiliated with one another. Example locations in which network nodes may be deployed range from individual buildings to entire cities, and locations of at scales in-between.

The network nodes 110A-B can receive data from a number of data sources 115A-E. As with the network nodes 110A-B, the data sources 115A-E can include any of a variety of different computing devices, including computing devices serving as a proxy between a network node and one or more other devices, for example devices in a local network. The data sources 115A-E in communication with network nodes 1120A-B can be, for example, individual user computing devices, such as mobile phones or personal computers; one or more servers; or any of a variety of computing devices, including wearable devices and sensor devices, embedded systems, or other devices configured to communicate with the network node. The way in which the data source communicates with the network node can vary, such as over a radio access network, a core network, or as part of an operational support system.

Each data source sends a respective input data stream 116A-E to the network nodes 110A-B. Each input data stream includes data that is input to the inferencing engine of the receiving network node. In response, the network node can process input data in the received stream and generate output data in response. The output data can be generated by the inferencing engine, for example by processing the input data through a machine learning model trained to process the input data. Some data sources, such as data source 115A, can send multiple input streams to a network node, such as input streams 116A, 117A to the network node 110A. The separate streams can correspond to input received from a larger network of devices behind the data source 115A. For example, the data source 115A can be one or more computing devices, with the network node acting as a proxy between the network node 110A and one or more other computing devices or networks of devices. Each device or network of devices can send a respective stream of input data to the network 110A, either directly or through one or more proxy devices.

As described in more detail herein, the data management system 100 is configured to train machine learning models for deployment on the network nodes 110A-B. The system 100 receives a stream of input data regulated according to a policy generated by the system 100, and uses the regulated stream as training data for training one or more machine learning models. The task the machine learning models deployed as part of the inferencing engines 114A-B can vary depending on specific requirements the network nodes 110A-B are configured to meet. Examples of machine learning tasks which deployed machine learning models can be trained to perform follow.

As an example, the input to an inferencing engine of a network node can be in the form of images or videos. The inferencing engine can be configured to extract, identify, and generate features as part of processing a given input through one or more deployed machine learning models, for example as part of a computer vision task. Machine learning models trained to perform this type of machine learning task can be trained to generate an output classification from a set of different potential classifications. In addition or alternatively, the machine learning model can be trained to output a score corresponding to an estimated probability that an identified subject in the image or video belongs to a certain class.

For instance, the network node 110A can be part of a system for monitoring an industrial manufacturing process, in which objects are designed and/or manufactured. The data sources 115A-E can include one or more sensors collecting sensor data at various points in a manufacturing line, including image or video data. The inferencing engine 114A can process the input data through a machine learning model trained to detect anomalies in manufactured objects, and flag those anomalies for further inspection and/or to take some predetermined action in response to the detection.

As another example, the input to an inferencing engine of a network node can include data files corresponding to a particular format, such as HTML files, word processing documents, or formatted metadata obtained from other types of data, such as metadata for image files. Machine learning model(s) deployed as part of the inferencing engine can be trained to classify, score, or otherwise predict some characteristic about the received input. For example, the machine learning model(s) can be trained to predict the probability that the received input includes text relating to a particular subject. Also as part of performing a particular task, the machine learning model can be trained to generate text predictions, for example as part of a tool for auto-completion of text in a document as the document is being composed. A machine learning model can also be trained for predicting a translation of text in an input document to a target language, for example as a message is being composed.

In the above example, data sources providing data in this example can include user computing devices, which can provide queries to the network node including data files or plain text for processing. The user computing devices can interact with the network node over an interface, such as a web interface accessed through a web browser or application installed on the user computing device.

As another example, the input to the inferencing engine of a network node can be audio input, including streamed audio, pre-recorded audio, and audio as part of a video or other source or media. Machine learning model(s) deployed as part of a network node inferencing engine can be trained to perform speech recognition, including isolating speech from other identified sources of audio and/or enhancing characteristics of identified speech to be easier to hear. A machine learning model can be trained to predict an accurate translation of input speech to a target language, for example in real-time as part of a translation tool. Data sources can include user computing devices, such as wearable devices, including earbuds, headsets, etc., configured to communicate audio data in real-time for processing by a network node.

Other types of input documents can be data relating to characteristics of a network of interconnected devices. These input documents can include activity logs, as well as records concerning access privileges for different computing devices to access different sources of potentially sensitive data. Deployed machine learning model(s) can be trained by the training engine 104 for processing these and other types of documents for predicting on-going and future security breaches to the network. For example, the machine learning model(s) can be trained to predict intrusion into the network by a malicious actor. As another example, a machine learning model can be trained to classify anomalous data from a set of input documents, and flag instances of predicted anomaly for further manual review and/or automatic correction. Data sources in this example can include computing devices in a local network, configured to monitor and record network activity and forward the records to a network node deploying one or more machine learning models for processing the records, as described in this example and others.

In addition to data input, including the various types of data described herein, the inferencing engines 114A-B can be configured to preprocess features corresponding to given input. Features are values, for example, numerical or categorical, which relate to some characteristic of the input. For example, in the context of an image, a feature of the image can relate to the RGB value for each pixel in the image. The inferencing engines 114A-B can be configured to extract and select relevant features for processing to generate an output for a given input, and can also be trained to generate new features based on patterns identified by the deployed models between various characteristics of input data. In some examples, the deployed machine learning model(s) of an inferencing engine can be trained to perform some or all of the feature processing/extraction for given input data.

Figure 2:
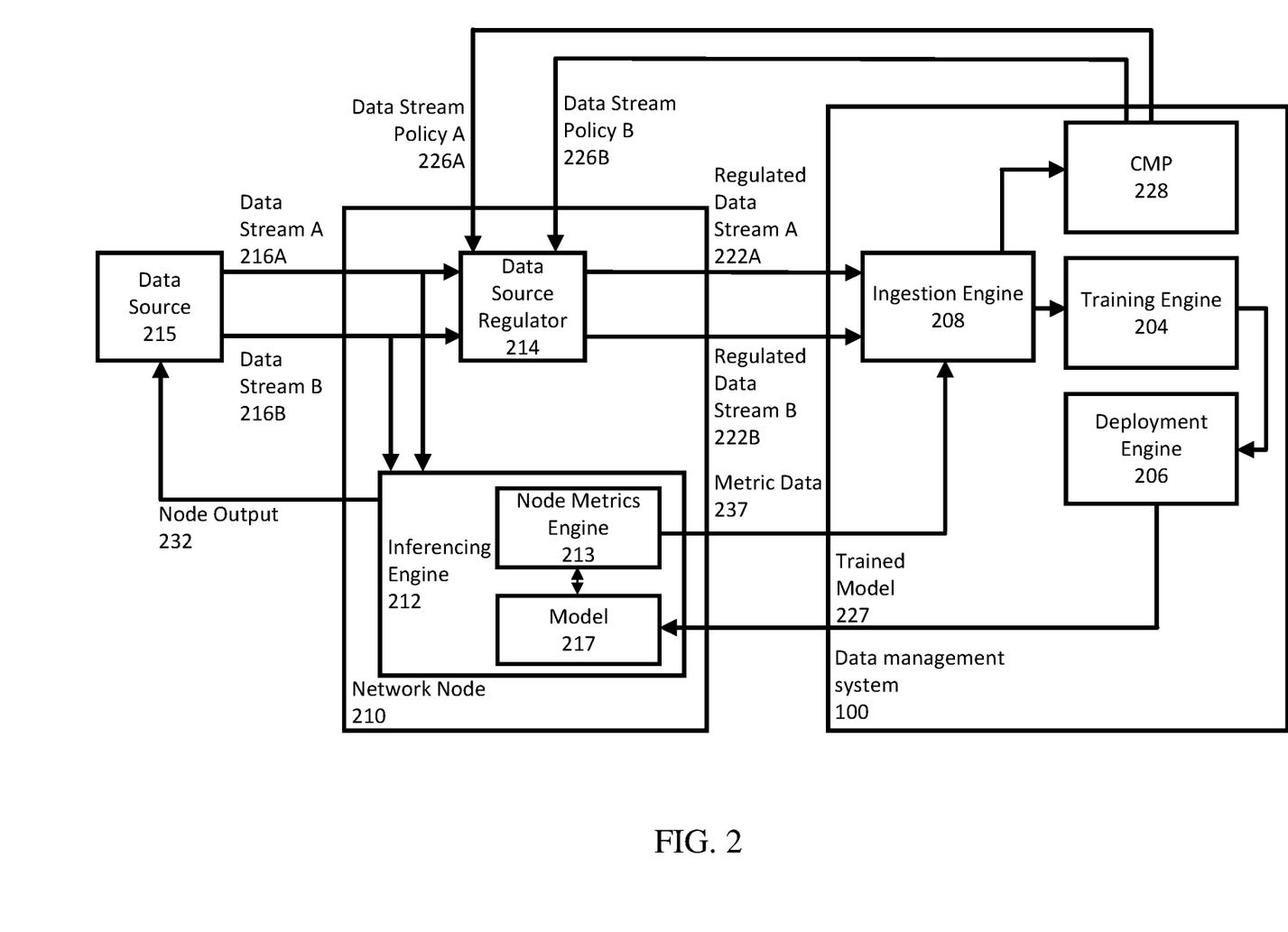
FIG. 2 is a block diagram of the example data management system interacting with a network node, according to aspects of the disclosure.

FIG. 2 is a block diagram of the example data management system 100 interacting with a network node 210, according to aspects of the disclosure. FIG. 2 shows a data source 215 transmitting input data stream A 216A and input data stream B 216B to a network node 210. The data streams 216A-B are received by a data source regulator 214 and an inferencing engine 212 of the network node 210. The inferencing engine 212 can include a node metrics engine 213 and a model 217. The model 217 can be one or more of any of a variety of machine learning models trained to perform a machine learning task by processing an input data stream, as described herein with reference to FIG. 1. The model 217 can generate output which can at least partially form a node output 232 that is sent to the data source 215. The node output 232 can be a response to the input data received from the data source 215. For example, the data source 215 can pass a query or request to process some input data as part of an input data stream. In other examples, the node output 232 can be passed to other network nodes sharing a connection with the network node 210 (not shown).

The inferencing engine 212 can receive the input data and request, process the input data according to the request, for example, according to any parameters for processing the input data provided as part of the request, and generate a model output in response to the processed input data. The network 210 can send the model output and optionally any additional information to the data source 215. The data source 215 can receive the node output 232, and send the output 232 to one or more connected computing devices, for example for continued downstream processing. In some examples, instead of receiving a request to process data from a data stream, the network node 210 is configured to automatically process received data, for example as received or according to any of a variety of predetermined parameters.

The data source regulator 214 passes regulated input data streams A, B 222A-B to the system 100. A regulated input data stream is an input data stream received from a data source after a respective data stream policy is applied to the input data stream, for example by the data source regulator 214. For example, the data source regulator 214 receives data stream policies A, B 226A-B from a central management plane (CMP) 228 of the system 100. A data stream policy can include one or more rules, which when applied by the data source regulator 214 to a data stream, adjusts the transmission of the data stream to the data management system 100 in one or more ways. For example, the rules can specify the rate of the stream of input data transmitted by the network node; the volume of the stream of input data transmitted by the network node; and/or the types of data in the stream of input data transmitted by the network node. The data source regulator 214 is configured to convert a received policy into one or more instructions executable by the data source regulator 214 to cause the data source regulator 214 to apply the policy in transmitting a data stream.

The CMP 228 generates the policy to meet a number of objectives, such as objectives for reducing the operational cost of transmitting the regulated stream of input data over a distributed network or using the regulated stream of input data to train the machine learning model 217, and increasing the output quality of the deployed machine learning model according to one or more quality metrics, after training the model on the regulated stream of input data. The CMP 228 balances at least two objectives in generating a data stream policy, lowering the operational cost to transmit and process input data for training as low as possible, while raising the output quality of models deployed on the network node and trained by the system 100 to meet predetermined output quality thresholds. In other examples, the CMP 228 is configured to raise output quality of models deployed on the network node and trained by the system 100 as high as possible, while also balancing the operational costs to transmit streams of data for training.

In some examples, the CMP 228 may generate the policy according to other objectives, in addition to increasing model output quality and reducing operational cost for transmitting and processing streams of input data. For example, the CMP 228 may generate the policy to reduce bias in the trained machine learning model deployed on the network node. Bias is the difference between outputs generated by a machine learning model and a ground-truth or correct output, for a given input. The machine learning model may become biased for a variety of reasons, which can stem from the training data used to train the model. In addition to balancing operational cost and model output quality, the CMP 228 can be configured to generate policies to regulate data streams received by the data management system 100 to reduce bias in a machine learning model trained using the regulated data streams. For example, the generated policy can specify one or more filters that when executed by a network node, causes the network node to filter out certain types of data that have been identified by the data management system 100 as biasing a deployed model.

The operational cost for transmitting the regulated stream of data, such as the data streams 222A, 222B, can be measured in processing cycles or in computing resources for transmitting the data between the node 210 and the system 100. The operational cost can be reflected, for example, in processing cycles required by either the node 210 or the system 100 in sending and receiving the data streams, respectively; network bandwidth required to transmit the data; time spent transmitting the data and the latency between sending and receiving the data; and any latency caused in other transactions across the network as a result of transmitting the data stream, for example because other data was queued and delayed while waiting for the data stream to be sent across the network.

The operational cost of transporting input data can be based on the cost, for example in time or in number of processing cycles, for transmitting a stream of input data to the system 100 at different rates or volumes. The rate at which a stream is transmitted can be measured as units of data over a period of time, such as megabytes per second. Higher rates generally incur a higher operational cost than lower rates of data transmission. The volume at which a stream is transmitted can be measured as units of data, for example in gigabytes or terabytes. Higher volumes of data transmitted by the network node 210 to the system 100 generally require more computing resources—and therefore have a higher operational cost—to process, over lower volumes of data.

The operational cost for transmitting a data stream can also be based on when the data stream is sent to the system 100. For example, some periods of time may correspond with less network activity, making the operational cost to transmit the data stream lower, at least because the chance of delay in transmitting the stream, or other data as a result of transmitting the stream, is lower. On the other hand, transmitting the data stream during other periods of time may conflict with other data transmitted during a period of peak network activity.

The operational cost for transmitting a data stream can also be based on the type of data that is being transmitted or processed in the data stream. For example, some types of data, such as tensors or higher-order data structures, are generally more computationally intensive to transmit and process over other types of data, such as bit indicators or data transmitted as un-encoded raw bytes. A data stream may include one or more types of data, and the network node may transmit some, all, or none of a type of data based on a received policy from the CMP 228.

The operational cost for processing the regulated stream of data can refer to one or more measures of computing resources used in training a machine learning model using the regulated stream of data as input. For example, the operational cost can be measured in number of processing cycles and/or time in preparing the stream of data for training, and training, validating, and testing the model according to the prepared training data.

The CMP 228 balances lower operational cost with improving the output quality of a model trained by the system 100 and deployed on a network node. Output quality can be measured in a variety of different ways, for example the output quality can be measured according to one or more of the inference accuracy, the inference precision, and the inference recall of the machine learning model after training or retraining the machine learning model on training data including the regulated stream of input data. The node metrics engine of a network node, such as the node metrics engine 213, is configured to generate these metrics for the output of a model deployed on the network node.

The node metrics engine 213 can be configured to receive or generate ground-truth labels after the model 217 generates and sends a model output to the data source 215. The data source 215 can be configured to obtain confirmation as to the accuracy of a model output, for example from user input or through independent and automatic mechanisms for verifying the model output. In response, the data source 215 can provide feedback to the model output, which the node metrics engine 213 can use to generate metrics as described herein.

The CMP 228 may also receive predetermined thresholds for a minimum output quality of a model deployed on the network node 210. For example, the CMP 228 may receive a minimum output quality threshold specifying 99% recall for the deployed model on received input data. In other examples, the CMP 228 may provide its own minimum threshold, if one is not provided.

The CMP 228 can be implemented as a machine learning model trained to generate data stream policies, as described herein. The CMP 228 can receive, as training data, one or more training examples of the output quality of models deployed on various network nodes, labeled with characteristics of a data stream provided by the network node to the CMP. Training examples can include data characterizing one or more of the inference accuracy, the inference precision, and the inference recall of a deployed machine learning model. The labels for the training examples can include data characterizing one or more of the rate of the stream of input data, the volume of the stream of input data, and the types of data in the stream of input data transmitted by the network node to the CMP. The CMP 228 can be trained according to a variety of approaches, for example as a supervised machine learning model trained using stochastic, batch, or mini-batch gradient descent. The training data can be generated by the ingestion engine 208, configured to receive both regulated data streams and metric data 237 from the node metrics engine 213.

In addition or alternatively, the training examples include additional data further characterizing a network node with a deployed machine learning model. The node metrics engine of a network node, for example, the node metrics engine 213 of the network node 210, can be configured to collect values for different metrics at least partially characterizing the network node itself, including received data from the data source(s), and/or the data source(s) themselves.

For example, the node metrics engine 213 can collect data related to the deployment of the network node itself. This data can include physical characteristics of the network or of the network node itself, e.g., the location of one or more computing devices or processors implementing the network node, or the type of hardware or infrastructure the network node is built using. The data at least partially characterizing the network node can include characteristics of one or more streams of data received by the network node, such as the rate, volume, and types of data transmitted to the network node from one or more data sources. These characteristics can also include temporal information, such as how often data is received, and at what rates data is received in a stream by the network node over different periods of time.

The ingestion engine 208 can receive data from network nodes and/or other devices in communication with the system 100 over the network 120. The ingestion engine 208 can distribute data to other components of the system 100, such as the CMP 228 and the training engine 204. The data received can include regulated data streams A, B 222A-B, as well as data streams that are unregulated, which may be received by a network node for which the CMP 228 has not generated a policy for a corresponding data stream.

Data streams received can be labeled by the ingestion engine 208 with identifiers, for example based on the origin of the data stream. An example identifier can be a tuple, for example in the form: <node identifier, data source identifier, data stream type>, specifying the network node from which the stream is received, the data source from which the network node received the stream, and the type of data, such as raw bytes or encoded data, respectively.

The ingestion engine 208 can also receive the metric data 237 generated by the node metrics engine 213. The regulated data streams A, B 222A-B can be sent to the training engine 204, which can be configured for training models that are deployed on various network nodes. The metric data 237 can be labeled with characteristics of input data streams received by the model 217, and be sent to the CMP 228 for training, as described herein.

The training engine 204 can train machine learning models according to any of a variety of training procedures, including supervised, unsupervised, and semi-supervised training approaches. Before the machine learning models are fully trained, tested, and deployed on respective network nodes, the training engine 204 can generate training data from the data streams 216A, B, labeled according to provided ground-truth labels. Similar to the labels of the training data for the CMP 228, the labels provided to the training engine 204 can be provided as feedback to the node output 232 provided to the data source 215.

The deployment engine 206 can be configured to send a trained model 227 trained by the training engine 204 to a corresponding network node. The deployment engine 206 can maintain data associating various network nodes with corresponding machine learning models. For example, each network node can execute one or more machine learning models as part of its respective inferencing engine, described herein. The one or more machine learning models executed by one network node, such as the network node 210, can at least partially overlap with one or more machine learning models of another network node. In some examples, the one or more machine learning models of one network node can be completely different than machine learning models implemented by another network node.

Telecommunication orchestrators and controllers are often deployed to manage network element configurations. Sometimes those configuration changes may lead to network anomalies. Upon detecting such anomalies, the CMP 228 would recommend rollback of configuration changes to the orchestrators or controllers. Such recommendations may be specific to some deployments, or applicable systems-wide.

Example Methods

Figure 3:
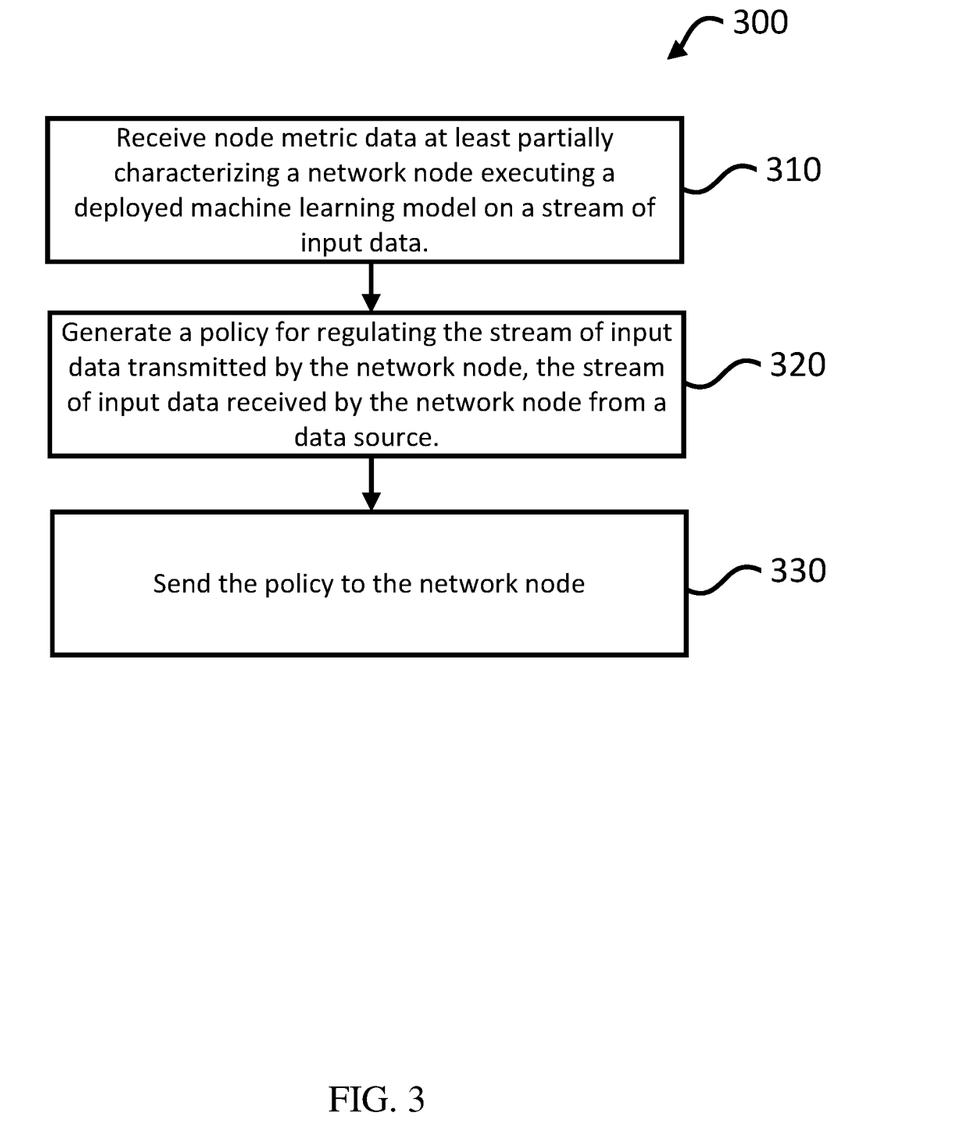
FIG. 3 is a flowchart of an example process for regulating a stream of output data for a network node of a distributed network.

FIG. 3 is a flowchart of an example process 300 for regulating a stream of output data for a network node of a distributed network. For example, the data management system 100 as described herein with reference to FIGS. 1-2 can perform the process 300.

The system receives node metrics data at least partially characterizing a network node executing a deployed machine learning model on a stream of input data, according to block 310. As described herein with reference to FIGS. 1-2, the node metrics data can at least partially characterize a network node, which may include characterizing different streams of input data to the network node. The process 300 is described herein with reference to a single data stream to a single network node, although it is understood that in other examples, multiple network nodes can be in communication with the data management system performing multiple instances of the process 300, in parallel or in sequence.

The system generates a policy for regulating the stream of input data transmitted by the network node, according to block 320. The stream of input data can be received by the network node from a data source, as described herein with reference to FIGS. 1-2. As described herein with reference to FIG. 2, the system can generate a respective per-data stream policy for each data stream. The policy can specify how a network node is to control the rate, volume, and types of data, among other things, to be transmitted to a central management plane for the system. The system can train a CMP to generate policies using training data of different quality metrics for different models deployed across network nodes of a distributed system, labeled with data characterizing one or more of the rate of the stream of input data, the volume of the stream of input data, and the types of data in the stream of input data transmitted by the network node to the CMP, among other quantifiable characteristics of the stream of input data.

The system sends the policy to the network node, according to block 330. The network node can be configured to execute the policy, for example by transmitting a regulated stream of input data to the CMP of the system with characteristics matching or approximating characteristics specified in the provided policy. As an example, if the policy specified transmitting data only during certain time periods, the network node can be configured to execute the policy by causing data to be transmitted only during those certain time periods.

Figure 4:
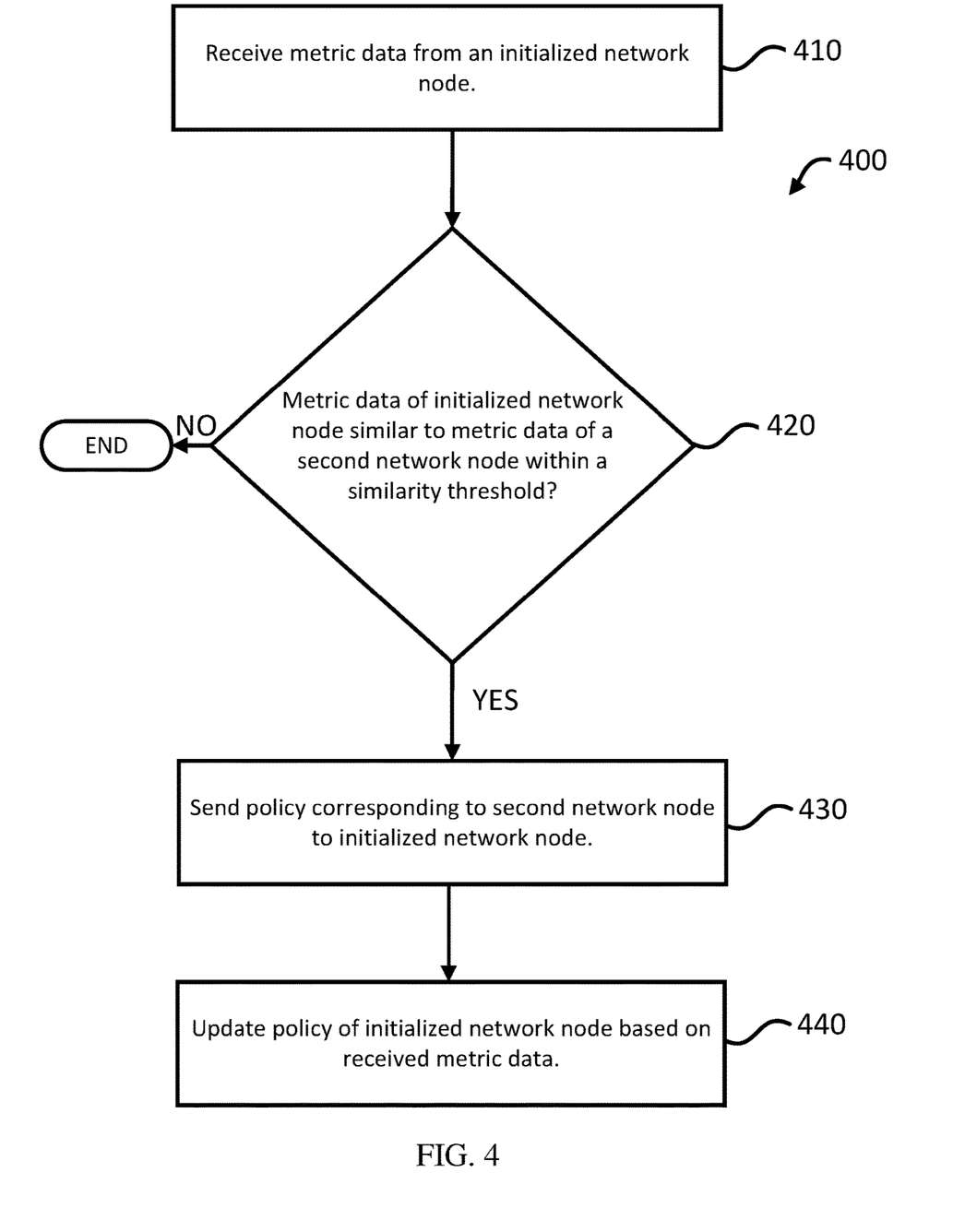
FIG. 4 is a flowchart of an example process for initializing a new network node of the distributed network, according to aspects of the disclosure.

FIG. 4 is a flowchart of an example process 400 for initializing a new network node of the distributed network, according to aspects of the disclosure. Initialization can refer to a process in which a computing platform connects to a new network node, for example to communicate data and to train a machine learning model for deployment on the network node. The network node can be created by allocating computing resources of the platform, or in some examples, created as one or more computing devices previously not connected to the platform. In those examples, initialization can include the process by which the platform connects to the new network node and begins communication.

As with the network nodes described herein with reference to FIGS. 1-2, the new network node presently described can also receive one or more data streams from one or more different data sources. Initially, the network node can send one or more streams of input data to the CMP for training, and to receive a trained machine learning model to deploy on the network node. The system can perform the process 300 described herein to generate policies for each data stream received by the new network node. In some examples, the data management system can perform the process 400, as part of initializing a new network node.

The CMP receives metric data from an initialized network node, according to block 410. An initialized network node can be a network node with a deployed machine learning model trained by the data management system. The initialized network node can be configured to send streams of input data to the CMP, but may not do so according to a policy as described herein.

The CMP determines whether the metric data of the initialized network node is similar to metric data of a second network node of the distributed network within a similarity threshold, according to diamond 420. The similarity threshold can be predetermined, for example based on empirical or statistical analysis of different data streams and different metrics having statistically significant correlations between the data stream and the policy applied to the stream. The similarity threshold can be multi-dimensional, meaning that several metrics at least partially characterizing the network node can be compared between the initialized network node and other network nodes of a distributed network.

If the data management system determines that there is no metric data similar to the metric data of the initialized network node ("NO"), then the process 400 ends. If the CMP determines that the metric data of the second network node is similar to the metric data of the initialized network node within a similarity threshold ("YES"), then the CMP sends the policy corresponding to the second network node, to the initialized network node, according to block 430. The second network node can be any network node for which the system has generated at least one policy.

The sent policy can bootstrap the regulation of data at the initialized network node, before the CMP generates a tailored policy based on node metrics data received from the new network node. In this way, the system can manage newly executed nodes to begin to balance output quality and operational cost. At scale, an approximated policy based on similarities previously generated policies can quickly reduce operational costs when many network nodes are initialized, over not providing any form of regulation at all, or providing a uniform policy which may not be individually suited for a deployed node.

The data management system updates the policy of the initialized network node based on received metric data, according to block 440. For example, the data management system can generate a policy for a data stream received from the initialized network node, according to the process 300 as described herein with reference to FIG. 3. In some examples, the data management system may not update the policy of a data stream of the initialized network node. In those examples, one reason for not updating the policy is because the policy provided performs better according to the applied objectives, such as model output quality and operational cost, than any other policy generated by the data management system.

The time at which the data management system updates the policy can be any length of time after sending the initial policy to the network node, as described according to block

430. For example, the data management system can send an updated policy to the network node as soon as one has been generated, or the data management system can generate the updated policy at a predetermined subsequent time, for example after a predetermined amount of time has passed to allow for additional input data to be received by the data management system. The predetermined amount of time can be configured, for example based on user input, or at the time the data management system is implemented on the platform.

Figure 5:
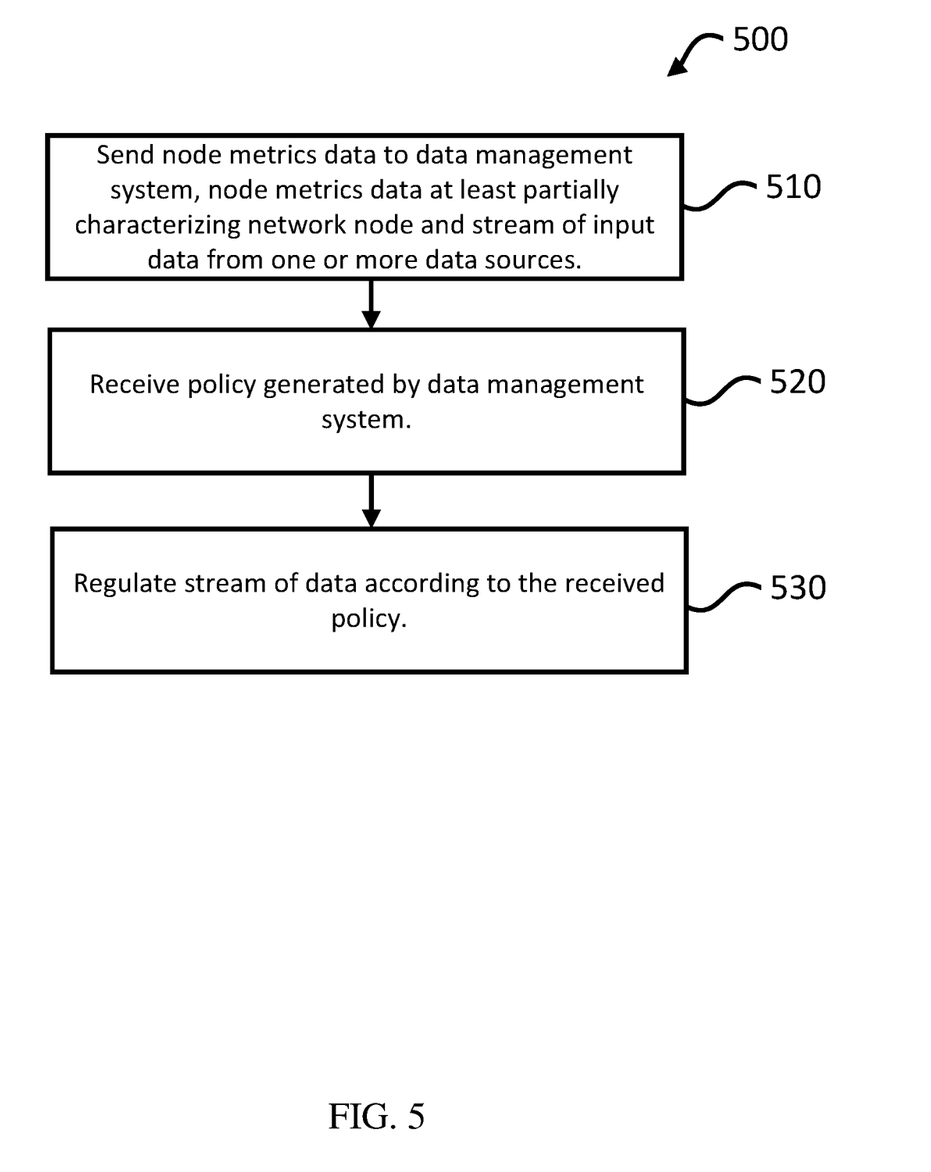
FIG. 5 is a flowchart of an example process for regulating a stream of output data on a network node of a distributed network, according to aspects of the disclosure.

FIG. 5 is a flowchart of an example process 500 for regulating a stream of output data on a network node of a distributed network, according to aspects of the disclosure.

A network node sends node metrics data to a data management system, according to block 510. As described herein with reference to FIGS. 1-2, the network node can implement a node metrics engine configured to generate metrics at least partially characterizing the network node and data streams received by the network node from one or more data sources.

The network node receives a policy generated by a data management system, according to block 520. The data management system can generate the policy using the node metrics data sent to the system by the network node, according to block 510.

The network node regulates the stream of data according to the received policy, according to block 530. The network node can be configured to convert the received policy into one or more instructions executable by the network node to cause the network node to adjust characteristics of a stream of input data transmitted to the data management system, in accordance with the policy.

Example Computing Environment

Figure 6:
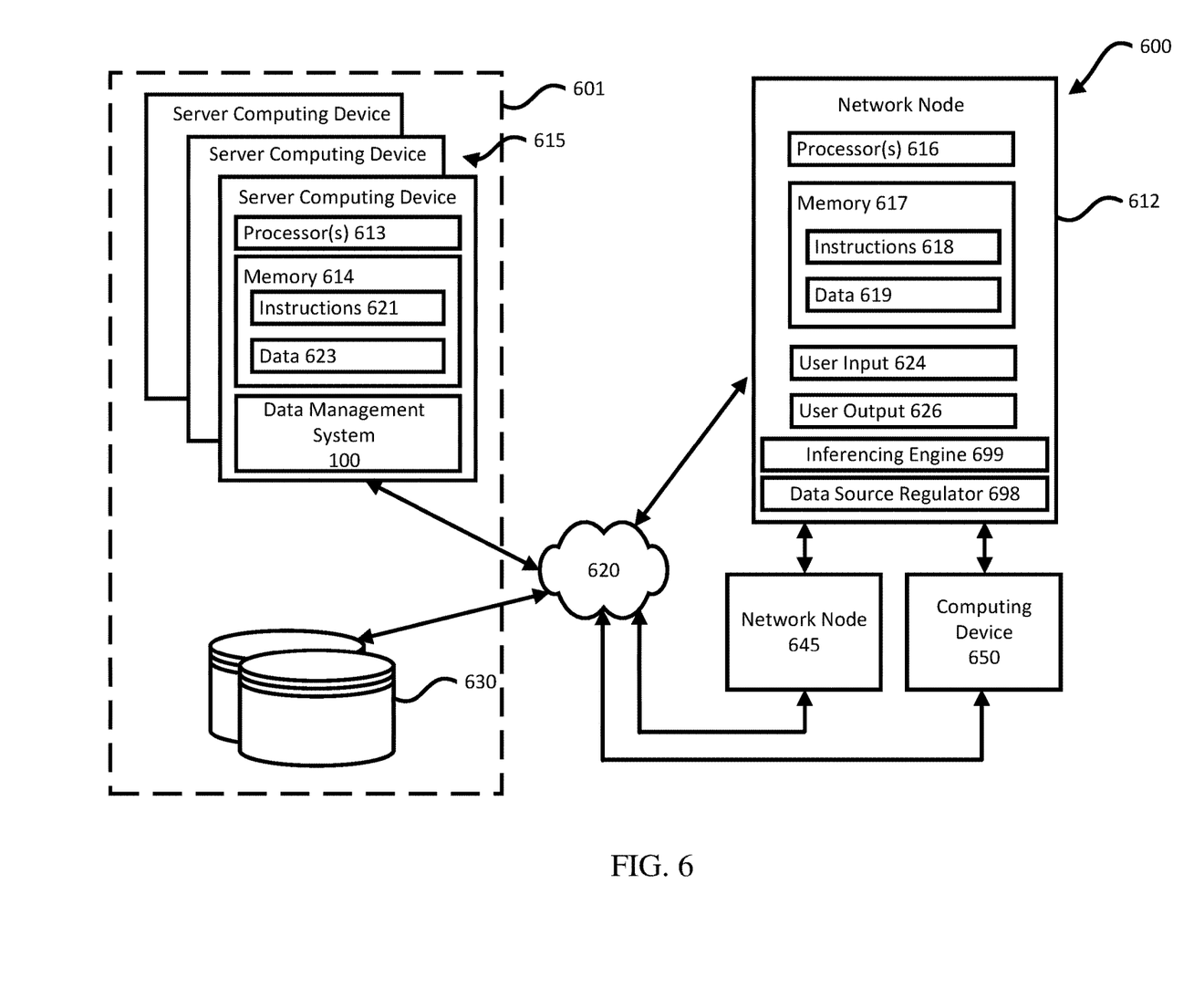
FIG. 6 is a block diagram of an example computing environment for implementing the data management system.

FIG. 6 is a block diagram of an example computing environment 600 for implementing the data management system 100. The system 100 can be implemented on multiple devices having one or more processors in one or more locations, such as one or more server computing devices 615 of a computing platform 601. The system 100 can communicate with multiple network nodes, such as network node 612 and network node 645. For example, the server computing device(s) 615 can make up at least part of the computing platform 101 of FIG. 1, and implement the central management plane 102, as well as other components, such as the training engine 204, deployment engine 206, and the ingestion engine 208 of the system 100. As another example, the network node 612 can implement an inferencing engine 699 and a data source regulator 698.

Network node 612 and the server computing device(s) 615 can be communicatively coupled to one or more storage devices 630 over a network 660. The storage device(s) 630 can be a combination of volatile and non-volatile memory, and can be at the same or different physical locations than the computing devices 612, 615. For example, the storage device(s) 630 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device(s) 615 can include one or more processors 613 and memory 614. The memory 614 can store information accessible by the processor(s) 613, including instructions 621 that can be executed by the processor(s) 613. The memory 614 can also include data 623 that can be retrieved, manipulated or stored by the processor(s) 613. The memory 614 can be a type of non-transitory computer readable medium capable of storing information accessible by the processor(s) 613, such as volatile and non-volatile memory. The processor(s) 613 can include one or more central processing units (CPUs), graphic processing units (GPUs), field-programmable gate arrays (FPGAs), and/or application-specific integrated circuits (ASICs), such as tensor processing units (TPUs).

The instructions 621 can include one or more instructions that when executed by the processor(s) 613, causes the one or more processors to perform actions defined by the instructions. The instructions 621 can be stored in object code format for direct processing by the processor(s) 613, or in other formats including interpretable scripts or collections of independent source code modules that are interpreted on demand or compiled in advance. The instructions 621 can include instructions for implementing components of the system 100 consistent with aspects of this disclosure. The system 100 can be executed using the processor(s) 613, and/or using other processors remotely located from the server computing device(s) 615, such as the one or more processors 616 of the network node 612.

The data 623 can be retrieved, stored, or modified by the processor(s) 613 in accordance with the instructions 621. The data 623 can be stored in computer registers, in a relational or non-relational database as a table having a plurality of different fields and records, or as JSON, YAML, proto, or XML documents. The data 623 can also be formatted in a computer-readable format such as, but not limited to, binary values, ASCII or Unicode. Moreover, the data 623 can include information sufficient to identify relevant information, such as numbers, descriptive text, proprietary codes, pointers, references to data stored in other memories, including other network locations, or information that is used by a function to calculate relevant data.

The network node 612 can also be configured similar to the server computing device(s) 615, with one or more processors 616, memory 617, instructions 618, and data 619. In some examples, the network node 612 can be a user computing device, such as a personal computer, a smartphone, a wearable device, or any other computing device configured for receiving user input and/or generating user output.

For example, the network node 612 can also include a user output 626, and an input 624. The user input 624 can include any appropriate mechanism or technique for receiving input from a user, such as keyboard, mouse, mechanical actuators, soft actuators, touchscreens, microphones, and sensors. The server computing device(s) 615 can be configured to transmit data to the user computing device(s) 612, and the network node 512 can be configured to display at least a portion of the received data on a display implemented as part of the user output 626. The user output 626 can also be used for displaying an interface between the network node 612 and the server computing device(s) 615. The user output 626 can alternatively or additionally include one or more speakers, transducers or other audio outputs, a haptic interface or other tactile feedback that provides non-visual and non-audible information to the platform user of the user computing device 612.

Although FIG. 6 illustrates the processors 613, 616 and the memories 614, 617 as being within the server computing device(s) 615 and network node 612, components described in this specification, including the processors 613, 616 and the memories 614, 617 can include multiple processors and memories that can operate in different physical locations and not within the same computing device. For example, some of the instructions 621, 618 and the data 623, 619 can be stored on a removable SD card and others within a read-only computer chip. Some or all of the instructions and data can be stored in a location physically remote from, yet still accessible by, the processors 613, 616. Similarly, the processors 613, 616 can include a collection of processors that can perform concurrent and/or sequential operation. The server computing device(s) 615 and network node 612 can each include one or more internal clocks providing timing information, which can be used for time measurement for operations and programs run by the server computing device(s) 615 and network node 612.

The network node 612 and/or the server computing device(s) 615 can be configured to receive requests to process data or other input from user computing device 650. The computing device 650 can be another network node connected to the distributed network 620, or a computing device that communicates with one or more nodes and/or the one or more server computing devices of the network 620.

The computing platform 601 in which the data management system 100 is implemented can be configured to provide a variety of services to users, through various user interfaces and/or APIs exposing the platform services. One or more services can be a machine learning framework or a set of tools for generating neural networks or other machine learning models according to a specified task and training data. The data management system 100 can be configured to train and deploy one or more machine learning models onto the multiple nodes of the network 620, as described herein. The user computing device 650 may transmit and receive data to and from the system 100, for example sending queries for processing by a deployed model, and receiving a prediction from the model in response.

Network node 645 can be similarly configured to network node 612, and be further configured to communicate with the server computing device(s) 615 directly through the network 620, or indirectly through one or more other network nodes, e.g., the network node 612. The devices, including the server computing device(s) 615, network nodes, such as network node 612 and network node 245, and the user computing device 250 can be capable of direct and indirect communication over the network 620. The devices of the network 620 can set up listening sockets that may accept an initiating connection for sending and receiving information.

The network 620 itself can include various configurations and protocols including the Internet, World Wide Web, intranets, virtual private networks, wide area networks, body area networks, personal area networks, near-me area networks, local area networks, campus area networks, telecommunication networks, including cellular networks, telephone networks, sensor networks, radio access networks (RAN), and backbone or core networks (CN), private networks using communication protocols proprietary to one or more companies, etc. The network 620 can span over different physical network infrastructures, maintained by one or more different providers. The network 620 can implement any of a variety of distributed computing architectures or paradigms, such as client-server based architectures, three-tier or multi-tier architectures, peer-to-peer architectures, distributed real-time systems, distributed database systems, systems based on parallel processing techniques, decentralized networks, mesh networks, etc.

The network 620 can support a variety of short- and long-range connections. The short- and long-range connections may be made over different bandwidths, such as 2.402 GHz to 2.480 GHz, 2.4 GHz and 5 GHz; 13.56 MHz; or with a variety of communication standards, such as communication standards for wireless broadband communication. The network 620, in addition or alternatively, can also support wired connections between the devices of the network 620, including over various types of Ethernet connection.

It is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system, or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A system comprising:
a distributed network of a plurality of network nodes; and
one or more processors in the distributed network, the one or more processors implementing a central management plane (CMP), the CMP configured to:
receive metric data at least partially characterizing a first network node of the plurality of network nodes executing a deployed machine learning model on a stream of input data received by the first network node from a data source;

generate a policy for regulating the stream of input data transmitted by the first network node to the one or more processors according to one or more objectives to reduce operational cost of transmitting the stream of input data over the distributed network while increasing output quality of the deployed machine learning model; and send the policy to the first network node.

2. The system of claim 1, wherein the policy comprises one or more rules for adjusting one or more of: a rate of the stream of input data transmitted by the first network node to the CMP, volume of the stream of input data transmitted by the first network node, a time at which the stream of input data is transmitted by the first network node, or types of data in the stream of input data transmitted by the first network node to the CMP.

3. The system of claim 1, wherein the CMP is further configured to receive a regulated stream of input data after the policy is applied to the stream of input data.

4. The system of claim 3, wherein the operational cost of transmitting the stream of input data is further based on one or more of: a rate at which the regulated stream of input data is received by the CMP over a period of time, a volume of the regulated stream of input data received by the CMP, or a type of data in the regulated stream of input data.

5. The system of claim 3, wherein the output quality of the deployed machine learning model is based on one or more quality metrics of the deployed machine learning model measuring one or more of inference accuracy, inference precision, or inference recall of the deployed machine learning model after training or retraining the deployed machine learning model on training data comprising the stream of input data.

6. The system of claim 5, wherein, in generating the policy, the CMP is configured to process the metric data through a second machine learning model trained to generate policies, the second machine learning model trained using labeled metric data, the labeled metric data:

comprising features corresponding to one or more of the inference accuracy, the inference precision, or the inference recall of the deployed machine learning model; and being labeled with data characterizing one or more of a rate of the stream of input data, a volume of the stream of input data, or types of data in the stream of input data transmitted by the first network node to the CMP.

7. The system of claim 1, wherein the plurality of objectives further comprises one or more objectives for training the deployed machine learning model.

8. The system of claim 1, wherein the CMP is further configured to:

receive additional metric data at least partially characterizing the performance of the first network node executing the deployed machine learning model on an additional stream of input data; and generate and send an additional policy for regulating the additional stream of input data.

9. The system of claim 8, wherein the stream of input data and the additional stream of input data are received from the first network node by the same data source.

10. The system of claim 1, wherein the CMP is further configured to:

receive an indication of a second network node added to the distributed network;

receive metric data from the second network node;

determine, based on the metric data of the first network node and the metric data of the second network node, that the first and second network nodes are within a predetermined threshold of similarity; and send the policy to the second network node.

11. The system of claim 1, wherein the CMP is further configured to:

receive additional metric data from a second network node of the plurality of network nodes;

generate a second policy using at least one of the metric data or the additional metric data; and send the second policy to the second network node.

12. The system of claim 1, wherein in regulating the stream of input data, the CMP is further configured to adjust the transmission of data in the stream of input data.

13. The system of claim 1, wherein the metric data at least partially characterizing a first network node of the plurality of network nodes comprises one or more of: physical characteristics of the distributed network or of the first network node, characteristics of one or more streams of data received by the first network node, or characteristics of the data source.

14. A computer-implemented method, comprising:

receiving, by one or more processors, metric data at least partially characterizing a first network node of a plurality of network nodes executing a deployed machine learning model on a stream of input data received by the first network node from a data source, the plurality of network nodes being part of a distributed network;

generating, by the one or more processors, a policy for regulating the stream of input data transmitted by the first network node to the one or more processors according to one or more objectives to reduce operational cost of transmitting the stream of input data over the distributed network while increasing output quality of the deployed machine learning model; and sending, by the one or more processors, the policy to the first network node.

15. The method of claim 14, wherein the policy comprises one or more rules for adjusting one or more of: a rate of the stream of input data transmitted by the first network node to the one or more processors, volume of the stream of input data transmitted by the first network node, a time at which the stream of input data is transmitted by the first network node, or types of data in the stream of input data transmitted by the first network node to the one or more processors.

16. The method of claim 15, further comprising receiving, by the one or more processors, a regulated stream of input data after the policy is applied to the stream of input data.

17. The method of claim 16, wherein the operational cost of transmitting the stream of input data is further based on one or more of: a rate at which the regulated stream of input data is received by the one or more processors over a period of time, a volume of the regulated stream of input data received by the one or more processors, or a type of data in the regulated stream of input data.

18. The method of claim 16, wherein the output quality of the deployed machine learning model is based on one or more quality metrics of the deployed machine learning model measuring one or more of inference accuracy, inference precision, or inference recall of the deployed machine learning model after training or retraining the deployed machine learning model on training data comprising the stream of input data.

19. The method of claim 18, wherein generating the policy comprises processing, by the one or more processors, the metric data through a second machine learning model trained to generate policies, the second machine learning model trained using labeled metric data, the labeled metric data:

comprising features corresponding to one or more of the inference accuracy, the inference precision, or inference recall of the deployed machine learning model; and     being labeled with data characterizing one or more of a rate of the stream of input data, a volume of the stream of input data, or types of data in the stream of input data transmitted by the first network node to the one or more processors.

20. One or more non-transitory computer-readable storage media encoding instructions that when executed by one or more processors, cause the one or more processors to perform operations comprising:

receiving metric data at least partially characterizing a first network node of a plurality of network nodes executing a deployed machine learning model on a stream of input data received by the first network node from a data source, the plurality of network nodes being part of a distributed network;

generating a policy for regulating the stream of input data transmitted by the first network node to the one or more processors according to one or more objectives to reduce operational cost of transmitting the stream of input data over the distributed network while increasing output quality of the deployed machine learning model; and     sending the policy to the first network node.

\* \* \* \* \*